Patented June 9, 1925.

1,541,744

UNITED STATES PATENT OFFICE.

BRUCE K. WISEMAN, OF INDIANAPOLIS, INDIANA, ASSIGNOR TO ELI LILLY AND COMPANY, OF INDIANAPOLIS, INDIANA, A CORPORATION OF INDIANA.

MEDICINAL TABLET.

No Drawing. Application filed February 18, 1924. Serial No. 693,506.

*To all whom it may concern:*

Be it known that I, BRUCE K. WISEMAN, a citizen of the United States, residing at Indianapolis, in the county of Marion and State of Indiana, have invented a new and useful Medicinal Tablet, of which the following is a specification.

It is the object of my invention to produce a medicinal tablet, and especially a hypodermic tablet, which has materially greater solubility, is more quickly soluble, and has more nearly uniform solubility at different temperatures, than is the case with such tablets now in use; so that the tablet may be more completely dissolved, may be more quickly dissolved, may be dissolved in a smaller quantity of water if for any reason that is desired, and may be dissolved with nearly equal facility in cold water and in hot water.

This makes it possible to prepare a hypodermic injection more quickly, with greater assurance of complete solution, and with water of any temperature. By reason of this quick solution, on account of the increased speed of solubility of the tablet, there is a very material advantage, especially in emergency cases, when quick action without the loss of an extra second is required on the part of the physician.

In carrying out my invention, I make the tablet of a mixture of the desired drug (any drug) with a carrier or diluent in any suitable proportions; but instead of using the ordinary form (the hydrate) of lactose or milk sugar as such carrier or diluent, I use a form of lactose or milk sugar which gives the advantages above set forth.

There are several forms of milk sugar suitable for this, all of which are substantially without that water of crystallization which requires heating materially above the boiling point of water in order to be driven off. These are:

1. The β-anhydride.
2. The α-anhydride.
3. The α-anhydride which, though it has taken up water, permits such water to be substantially driven off by heating to the boiling point of water or very slightly above it.
4. A mixture of some or all of forms 1, 2, and 3.

The form of milk sugar which I prefer is the mixture of the α-anhydride and the β-anhydride; with a second preference for the β-anhydride over the α-anhydride; but good results can be secured by the use of any of the three forms noted or a mixture of two or more of them.

It has heretofore been universal practice, so far as I am aware, to use the hydrate form of milk sugar or lactose as the carrier or diluent in the manufacture of medicinal tablets, and especially of hypodermic tablets. Such lactose hydrate is the ordinary form of milk sugar; and is the one formed by crystallization from water solution at normal temperatures. When it crystallizes, it has one molecule of water of crystallization, or about 5% by weight. The water of crystallization in ordinary milk sugar or lactose hydrate is so firmly held that it requires heating to about 125° or 130° C. to drive it off. This lactose hydrate has a widely variable solubility with variations in temperature, and one which at normal temperatures is low in comparison with that of the several forms of milk sugar I referred to above. The initial solubility of lactose hydrate varies from about 4.8 parts per 100 at the freezing point of water to about 40 parts per 100 at the boiling point of water, and is about 10 parts per 100 at blood temperature. These figures are those given by Hudson in the proceedings of the American Chemical Society, vol. 30, No. 7, page 1767.

The β-anhydride of milk sugar has much greater solubility in cold water, and in water at or near blood temperature, than has the hydrate form; and it has materially greater initial solubility in water at all temperatures, even hot water, than has the hydrate form; and it has more nearly uniform solubility at different temperatures. The initial solubility of the β-anhydride varies from about 31 parts per 100 at the freezing point of water only to about 49 parts per 100 at the boiling point of water, and is about 36 parts per 100 at blood temperature.

A similar comparison also exists for final solubilities, though with different ratios, with the β-anhydride having greater final solubility at all temperatures below 93° C.; but as only initial solubilities are ordinarily material in medicinal tablets, and especially hypodermic tablets. I have not given in detail the comparison of final solubilities.

These comparative initial solubilities make for the quicker and more complete solution of the β-anhydride than of the hydrate in water at all temperatures; and particularly so at all temperatures at which water is normally obtainable and at which it can be used for either oral or hypodermic administration. Further, the initial solubility of the β-anhydride is more nearly uniform throughout the entire range of water temperatures than is that of the hydrate; for the initial solubility of the β-anhydride varies less than $1\frac{1}{10}$ times the value at 0° for variations between 0° and 100° C., while the initial solubility of the hydrate varies over 11 times.

The figures given above are not intended to be absolutely exact. They indicate in a general way, and I think with fair exactness, what the conditions are. They show clearly the greater solubility of the β-anhydride under all conditions of normal administration. Further, they show the greater uniformity of the solubility of the β-anhydride throughout the temperature range.

I think it unnecessary to give specific comparisons involving the other forms of lactose which my broad invention contemplates. It suffices to say that all these forms have much greater initial solubility than has the hydrate, and have more uniform solubility throughout the working temperature-range than has the hydrate.

The forms of milk sugar which my invention contemplates may be obtained in various ways:

The β-anhydride may be obtained by evaporation to dryness of a water-solution of ordinary milk sugar at a temperature exceeding 93° C.; and when thus formed is quite stable and does not deliquesce. If the evaporation of the water-solution of ordinary milk sugar to dryness is carried on below 93° C., it is the ordinary hydrate form of milk sugar which crystallizes out, with about 5% by weight (or 1 molecule) of water of crystallization.

To prepare the α-anhydride, the crystals of the hydrate are heated at about 130° C. for several hours, to drive off the water of crystallization.

If the α-anhydride is allowed to stand for a few days, it takes up water from the air, to about 4% by weight. This water is apparently not combined with the milk sugar in the same way as is the water of crystallization in the ordinary lactose hydrate, for instead of requiring heating to about 125° to 130° C. to drive it off it can be driven off by heating to about 100° to 105° C., which is hardly over the boiling point of water. This 4% by weight of water which the α-anhydride takes up from the air on standing is less than that represented by one molecule of water of crystallization, and is the greatest amount of water present in any of the forms of milk sugar which my invention contemplates as a carrier or diluent in making medicinal tablets.

The solutions of the β-anhydride and of the α-anhydride have different initial optical rotation. The α-anhydride, like ordinary lactose hydrate, when first dissolved, has an optical rotation of about 86°; but this rotation is not constant, and in the course of a day or so diminishes to about 55°. The β-anhydride, on the other hand, when first dissolved, has an optical rotation of only about 36°; but this rotation is also not constant, and in the course of a day or so changes to about 55°. Probably when the final value of the optical rotation has been attained the solution contains equilibrium amounts of the β-anhydride and of either the α-anhydride or the hydrate. This mutarotation is one way of distinguishing the β-anhydride from the α-anhydride and from the hydrate.

If desired, mixtures of the α-anhydride and the β-anhydride may be made in any manner for use in accordance with my invention. This may be by mechanical mixing. However, I prefer to use a mixture which is primarily obtained in equilibrium proportions, and free from optical mutarotation. Such a mixture in equilibrium proportions may be obtained by precipitating the sugar from a boiling water-solution by the addition thereto of four or five volumes of boiling alcohol, preferably alcohol of at least 95% concentration. The crystals thus thrown down are apparently in equilibrium proportions, in that their solution is initially free from optical mutarotation. Such crystals may contain a small quantity of the hydrate, for I find that there is sometimes some combined water, usually less than 1% by weight. In no case do such crystals thus thrown down contain as much as 2½% by weight of water which requires heating to 125° C. in order to be driven off.

None of the forms of milk sugar contemplated by my invention contain as much as 2½% by weight of water which cannot be driven off at 105° C.; and in none of them does the total water exceed 4% by weight; and in any of them there is less water than that represented by one molecule of water of crystalization.

In making tablets in accordance with my invention, I mix the desired drug in any desired proportion with the form or forms of milk sugar which my invention contemplates. These proportions are varied in accordance with the nature of the drug, and in accordance with the size of the dose per tablet; but in substantially all instances the quantity of lactose will be many times greater than the quantity of the drug. Ordinarily, the amount of the lactose will exceed 95% of the complete tablet, and in many cases will exceed 99%. After the mixture in the desired proportions has been made, in the same way that it is now made when lactose hydrate is used, the tablets are molded in any usual or convenient manner, and are ready for quick use where needed.

I do not claim to have discovered the anhydrides of milk sugar. These have been known for twenty or thirty years at least, (with the possible exception of the equilibrium mixture obtained by precipitation with boiling alcohol,) and their properties have been investigated. Nevertheless, the universal practice has been to make medicinal tablets, and especially hypodermic tablets, with a carrier or diluent of lactose hydrate, in contradistinction to my present invention.

I claim as my invention:—

1. A medicinal tablet, comprising a mixture of the desired drug with a form of lactose containing less than 2½% by weight of water which cannot be driven off at 105° C.

2. A medicinal tablet, comprising a mixture of a desired drug with a form of lactose containing not to exceed 4% by weight of water.

3. A medicinal tablet, comprising a mixture of a desired drug with a form of lactose containing less water than that represented by one molecule of water of crystallization.

4. A medicinal tablet, comprising a mixture of a desired drug with a form of lactose of which at least part is a lactose anhydride.

5. A medicinal tablet, comprising a mixture of a desired drug with a form of lactose of which at least part is the β-anhydride of milk sugar.

6. A medicinal tablet, comprising a mixture of a desired drug with a form of lactose containing the α-anhydride and β-anhydride mixed.

7. A medicinal tablet, comprising a mixture of a desired drug with a form of lactose containing the α-anhydride and β-anhydride mixed in equilibrium proportions.

8. A medicinal tablet having its body portion comprised of an anhydride of milk sugar to facilitate the increased solubility of the same.

In witness whereof, I have hereunto set my hand at Indianapolis, Indiana, this 13th day of February, A. D. one thousand nine hundred and twenty-four.

BRUCE K. WISEMAN.